United States Patent [19]

Jones et al.

[11] 4,021,620

[45] May 3, 1977

[54] MULTIFREQUENCY SIGNAL RECEIVER WITH DIGITAL TONE RECEIVER

[75] Inventors: Charlie Luther Jones, Jupiter; William Lester Schulte, Jr., Lake Park, both of Fla.

[73] Assignee: RCA Corporation, New York, N.Y.

[22] Filed: Dec. 4, 1975

[21] Appl. No.: 637,749

[52] U.S. Cl. .......................................... 179/84 VF
[51] Int. Cl.$^2$ ....................................... H04M 1/50
[58] Field of Search ................ 179/84 VF, 16 EC; 324/78 D; 328/138

[56] References Cited

UNITED STATES PATENTS

| | | | |
|---|---|---|---|
| 3,760,269 | 9/1973 | Beeman et al. ............... | 179/84 VF |
| 3,935,395 | 1/1976 | Ball et al. ...................... | 179/84 VF |
| 3,949,177 | 4/1976 | Ball et al. ...................... | 179/84 VF |
| 3,959,603 | 5/1976 | Nilssen et al. ................. | 179/84 VF |

*Primary Examiner*—William C. Cooper
*Assistant Examiner*—Randall P. Myers

*Attorney, Agent, or Firm*—Carl V. Olson; H. Christoffersen; Samuel Cohen

[57] ABSTRACT

A converter, for converting a dual-tone multi-frequency (DTMF) signal produced by a TOUCH-TONE telephone to a 2-out-of-7 coded representation of the "dialed" number, includes an oscillator having a frequency much higher than the frequencies of the tones, a high band circuit for high band tone frequencies, and a low band circuit for low band tone frequencies. Each circuit includes a filter for passing the respective band of tone frequencies from an input terminal, a limiter for translating a received tone sine wave passed by the filter to a corresponding square wave, a counter, a switch enabled by the square wave output of the limiter for coupling the output of the oscillator to the input of the counter during a cycle of the square wave from the limiter, and a decoder for translating the resulting count in the counter to a signal on an output line representing one of the tone frequencies.

1 Claim, 4 Drawing Figures

MULTIFREQUENCY SIGNAL RECEIVER WITH DIGITAL TONE RECEIVER

BACKGROUND OF THE INVENTION

Multifrequency signaling systems typically employ coincident tone bursts coded in terms of frequency for the transmission of signaling information. Such multifrequency signals may be generated by a pushbutton TOUCH-TONE telephone subset in which pushing a numbered button produces two simultaneous tone bursts having frequencies in Hz as follows:

| Button No. | Low Freq. | High Freq. |
|---|---|---|
| 1 | 697 | 1209 |
| 2 | 697 | 1336 |
| 3 | 697 | 1477 |
| 4 | 770 | 1209 |
| 5 | 770 | 1336 |
| 6 | 770 | 1477 |
| 7 | 852 | 1209 |
| 8 | 852 | 1336 |
| 9 | 852 | 1477 |
| 0 | 941 | 1336 |

Pairs of tone bursts are transmitted over a telephone line as a person presses buttons indicating the number of a remote telephone being "dialed." A TOUCH-TONE receiver at a switching point translates the pairs of tone bursts back to signals representing numbers 0 through 9 for operation of the switching equipment.

In prior art multifrequency receivers, a high band filter is used to pass the high frequency band tones to one path in which an additional path filter is provided for passing each one of the specific high band tones. Similarly, a low band filter is used to pass the low frequency band tones along another path in which an additional filter is provided for passing each one of the specific low band tones. The additional filters are used to detect which tones are present.

The additional filters must each be designed to pass solely the intended frequency tone, and to block other frequency tones. The filters are expensive and less than entirely satisfactory because they must be carefully adjusted at the factory with the hope that they will remain adjusted in use and not have changing characteristics due to environmental conditions such as changing temperatures and power supply voltages.

SUMMARY OF THE INVENTION

A multifrequency signal receiver is constructed to detect a received tone by means of an oscillator having a much higher frequency than the frequency of the received tones, and a counter to which the output of the oscillator is supplied during a cycle of the received tone. A decoder responds to the resulting count in the counter to provide an output on a lead representing receipt of a corresponding particular one of the tones.

DESCRIPTION OF THE PREFERRED EMBODIMENT

Figure 1:
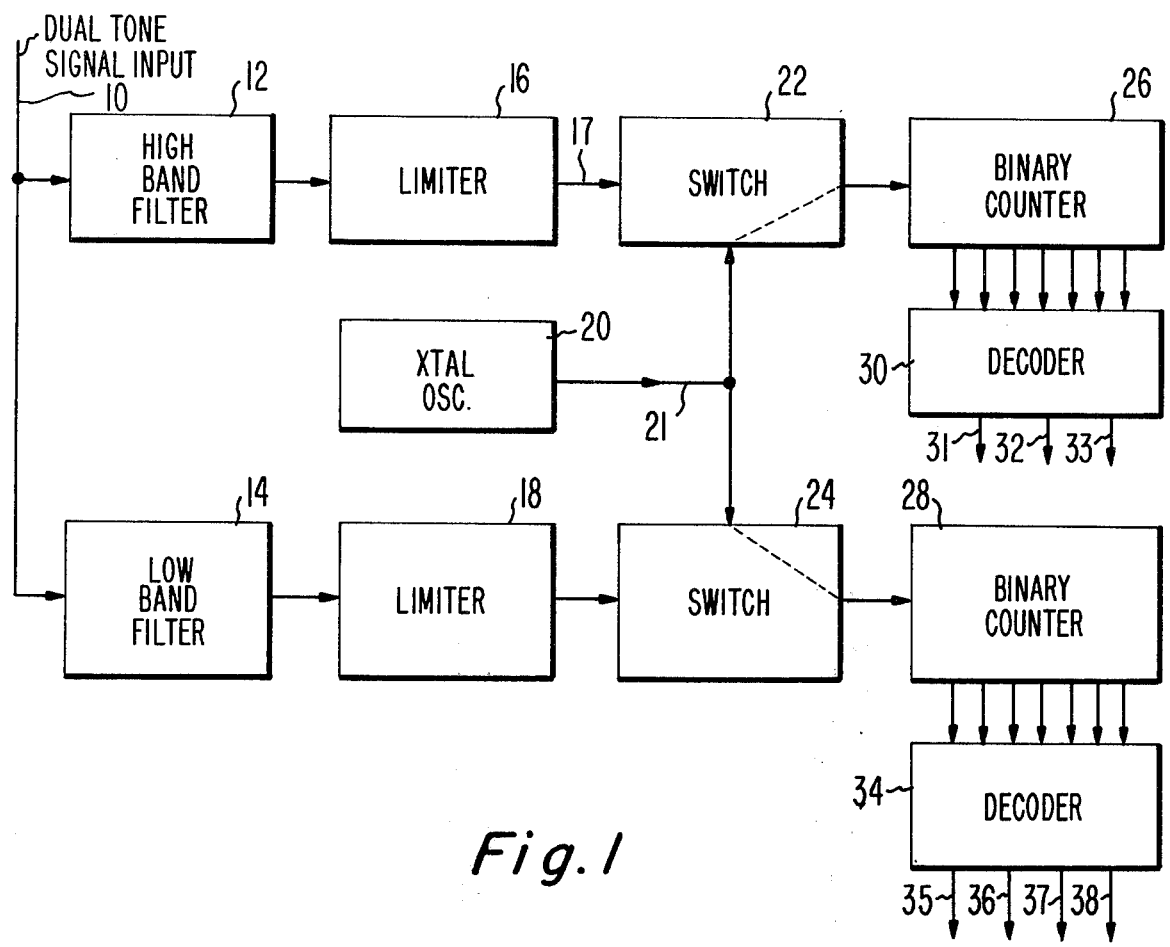
FIG. 1 is a block diagram of a dual-tone receiver for converting tones received from a TOUCH-TONE telephone to a 2-out-of-7 coded representation of a dialed number.

As shown in block diagram form in FIG. 1, a dual-tone receiver according to the invention receives input signals on a line 10 and applies them to the inputs of a high band filter 12 and a low band filter 14. The high band filter 12 is designed to pass the high frequency band tones of 1209, 1336 and 1477 Hz, and the low band filter 14 is designed to pass the low frequency band tones of 697, 770, 852 and 941 Hz. The filters may be of any suitable conventional type such as the seven-pole Chebychef filter including operational amplifiers and resistor-capacitor networks.

Figure 2:
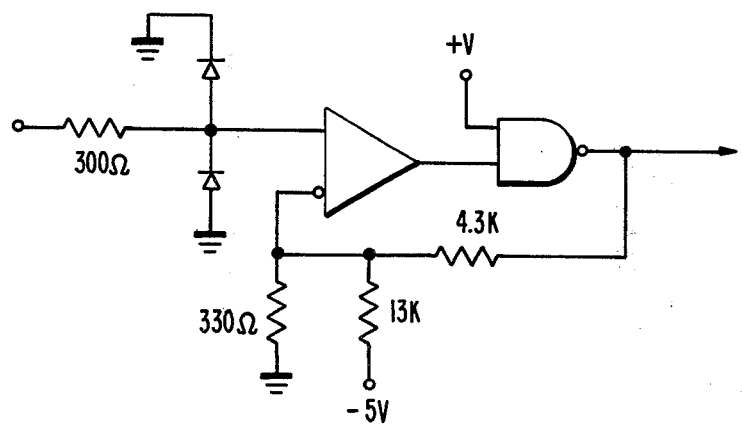
FIG. 2 is a circuit diagram of a limiter useful in the receiver of FIG. 1.

Tones passed by the high band filter 12 are applied to a limiter 16, and tones passed by the low band filter 14 are applied to a limiter 18. Each limiter may be an overdriven amplifier constructed as shown in FIG. 2, and both limiters may be constituted by a single Texas Instruments Co. Type SN75107 Differential Line Receiver. The limiters translate the received sine wave tones to square waves of the same frequency.

Square waves from limiters 16 and 18 are used to control switches 22 and 24, respectively. Switch 22 operates during alternate cycles of the square wave from limiter 16 to couple the output of a crystal oscillator 20 to the input of a binary counter 26. Similarly, switch 24 operates during alternate cycles of the square wave from limiter 18 to couple the output of crystal oscillator 20 to the input of a binary counter 28. The oscillator 20 may be any conventional, stable oscillator producing an output signal having a frequency which is much higher than the frequency of the highest frequency tone. The oscillator frequency may be 160,000 Hz compared with the highest frequency tone at less than 2,000 Hz. More than 80 cycles of the oscillator occur during a cycle of the highest-frequency tone.

The binary counter 26 counts the cycles of the oscillator applied to it through the switch 22 from the oscillator 20 during one cycle of a tone. A decoder 30 receives inputs representing the states of various stages of the counter 26 during the following cycle of a received high band tone and produces an output signal on one of its output lines 31, 32, and 33 representing high band tone frequencies of 1209, 1336 and 1477, respectively.

Similarly, the binary counter 28 counts the cycles of the oscillation applied to it through the switch 24 from the oscillator 20 during one cycle of a tone. A decoder 34 receives inputs representing the states of various stages of the counter 28 during the following cycle of a received low band tone and produces an output signal on one of its output lines 35, 36, 37 and 38 representing low band tone frequencies of 697, 770, 852 and 941, respectively.

Figure 3A:
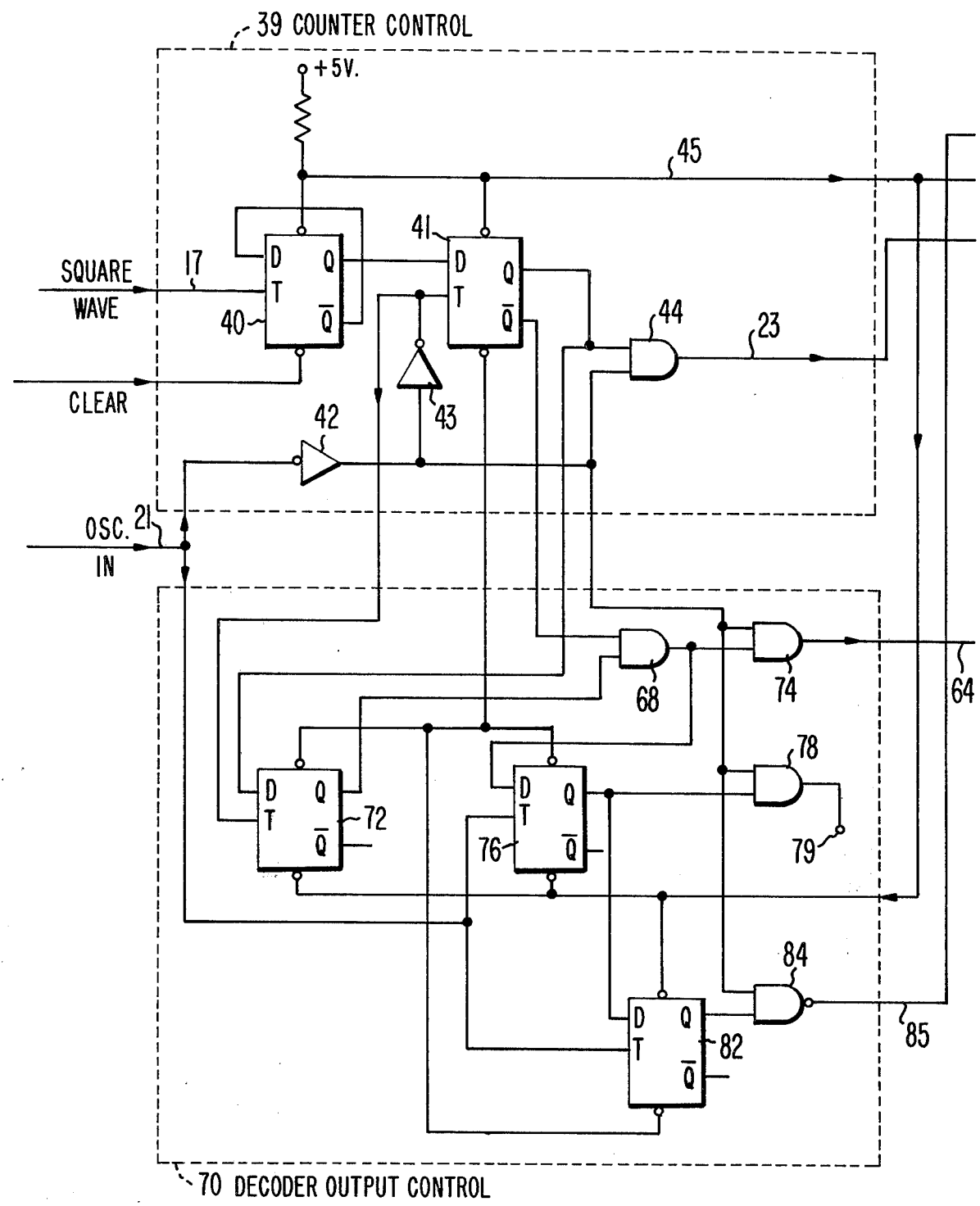
FIG. 3A and 3B together constitute a circuit diagram of a combined switch, counter and decoder useful in the receiver of FIG. 1.
Figure 3B:
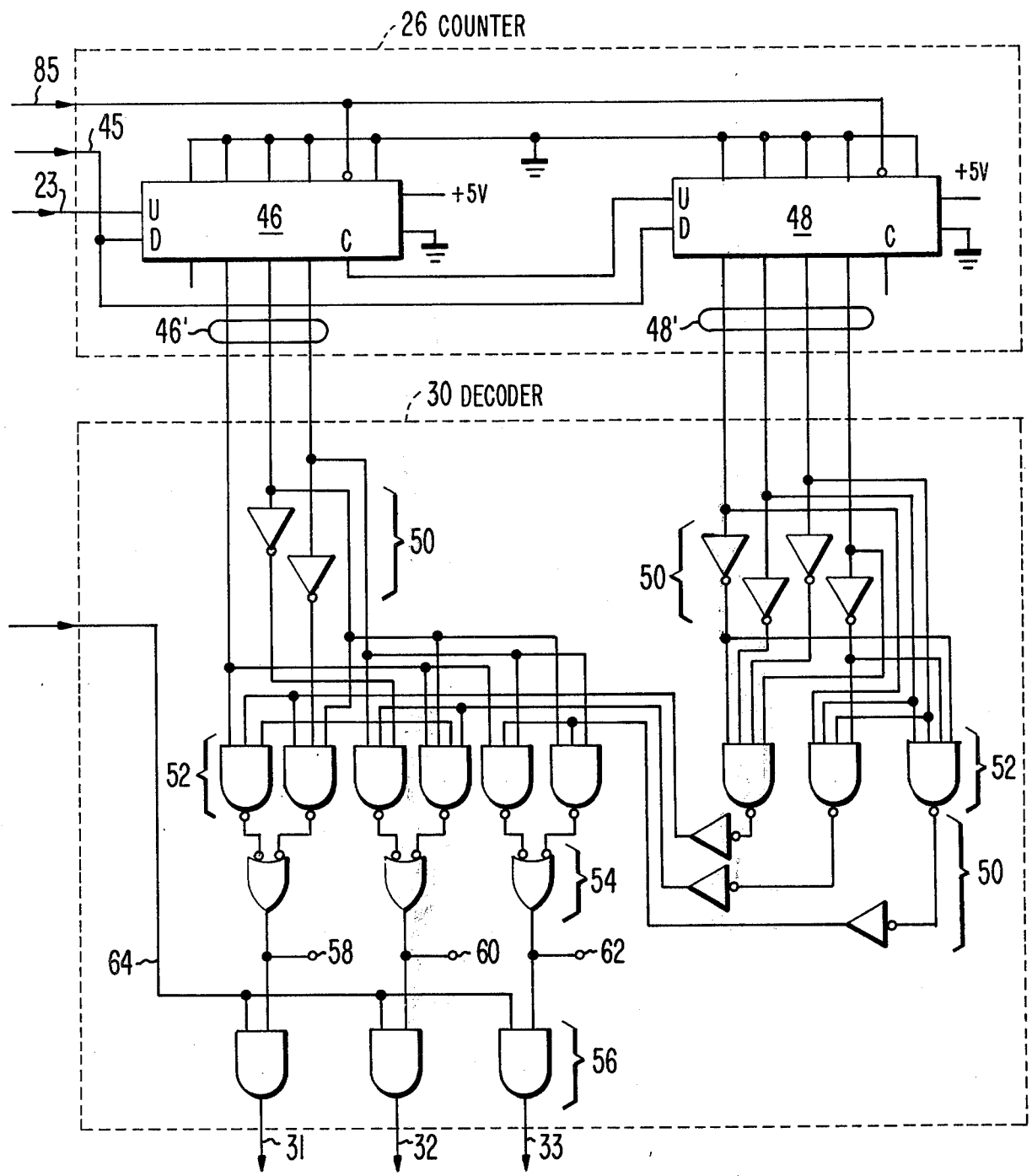

A detailed diagram of this switch 22 is shown in FIG. 3A, and detailed diagrams of the binary counter 26 and the decoder 30 are shown in FIG. 3B. The other switch 24 may be the same as switch 22, and the other counter 28 may be the same as counter 26. The other decoder 34 is similar to decoder 30 but is different in detailed connections because of different tone frequencies which are detected by the decoder.

In FIG. 3A, a counter control 39 forming part of switch 22 includes a flip-flop 40 which receives a square wave on its T input from limiter 16 over line 17.

The Q output of flip-flop is applied to the D input of a flip-flop 41. The T input of flip-flop 41 receives the output of crystal oscillator 20 over line 21, and inverters 42 and 43. An "and" gate 44 receives the Q output of flip-flop 41 and the output of oscillator 20 from the inverter 42. The gate 44, when enabled by the output of flip-flop 41, passes oscillations from oscillator 20 over line 23 to the input of counter 26 in FIG. 3B. Since the Q output of flip-flop 40 is connected back to its D input, the flip-flop 41 provides an output having a positive half cycle equal to a full period of the square wave applied to the trigger input over line 17 from the limiter 16. The gate 44 is thus enabled to pass cycles of the oscillator 20 to the counter during a full cycle of the square wave from limiter 16. During alternate cycles of the square wave from limiter 16, the count in the counter 26 is decoded and utilized.

The line 45 from flip-flops 40 and 41 to the counter 26 is for the purpose of biasing positive the unused inputs of the counter to improve its noise immunity.

The counter 26 in FIG. 3B includes two serially-connected integrated circuit binary counter units 46 and 48 which may be conventional units such as are manufactured and sold by Texas Instruments Corp. The input oscillator cycles or pulses are applied to the U input of unit 46 and the C output of unit 46 is connected to the U input of unit 48. The count of the number of oscillator pulses received by counter units 46 and 48 is available in binary form on output lines 46' and 48', which are connected to the input of decoder 30.

The decoder 30 consists of inverters 50, "and" gates 52, "or" gates 54 and output "and" gates 56. The decoder is constructed according to known design principles to provide an output at 58 when the count in counter 26 corresponds with a received tone burst at or near 1209 Hz, an output at 60 when the count in counter 26 corresponds with a received tone burst at or near 1336 Hz, or an output at 62 when the count in counter 26 corresponds with a received tone burst at or near 1477 Hz. These tone burst frequencies correspond with the three high-band tone burst frequencies. The other counter 28 and decoder 34 in FIG. 1 count and decode the four low-band tone burst frequencies. The signals at 58, 60 and 62 are passed to output lines 31, 32 and 33 when "and" gates 56 are enabled by a read-out signal on line 64 from the switch shown in FIG. 3A.

The described counting of cycles from the oscillator 20 during the period of one cycle of the square wave from limiter 16 is followed by one cycle of the square wave during which the count reached by counter 26 is decoded and the output of the decoder is transferred to a utilization device. During a decoding cycle, the outputs of flip-flop 41 disable gate 44 and enable an "and" gate 68 in a decoder output control circuit 70. The other input to "and" gate 68 is the output of a flip-flop 72 having an output which is delayed one clock period relative to flip-flop 41. The output of gate 68 is thus a pulse having a duration of one clock pulse during the decoding cycle. The output of gate 68 and the inverted clock or oscillation wave are applied to an "and" gate 74 which generates a sample pulse on line 64. The sample pulse enabled gates 56 in FIG. 3B at a time when all inputs to the decoder were stable and passes the decoder output to output lines 31, 32 and 33. An output appears on one of the outputs 31, 32 and 33 when a high frequency tone burst is received.

Another flip-flop 76 and "and" gate 78 provide an additional control pulse delayed another cycle of the oscillator clock wave from the sample pulse on line 64. This control pulse at 79 may be used to transfer the outputs of the decoder 58, 60 and 62 to a buffer register (not shown) after the outputs have been validated by a validity checker (not shown) during the time of sample pulse on line 64.

Yet another flip-flop 82 and "and" gate 84 provide a control pulse which is delayed yet another oscillator clock pulse period relative to the pulse at 79. This control pulse on line 85 is applied to the clear or reset input of counter 26 to prepare the counter for the next following counting cycle determined by the next cycle from the limiter 16. The apparatus counts cycles from the oscillator during alternate cycles from limiter 16, and decodes the counts during intermediate cycles from the limiter 16.

What is claimed is:

1. A dual-tone multifrequency receiver for translating the tones produced by a push button telephone to a 2-out-of-7 coded representation of the dialed number, comprising an oscillator having a frequency much higher than the frequencies of said tones, a high band circuit for high band tone frequencies, and a low band circuit for low band tone frequencies, each circuit including:

a filter for passing the respective band of tone frequencies from an input terminal, a limiter for translating a received tone sine wave passed by said filter to a corresponding square wave, a counter, a switch enabled by the output of said limiter for coupling the output of said oscillator to the input of said counter during alternate cycles of the square wave from the limiter, and a decoder operative during intermediate cycles of the square wave from the limiter for translating the resulting count in the counter to a signal on an output line representing a corresponding one of the tone frequencies in said respective band of tone frequencies.

* * * * *